United States Patent [19]

Ariyoshi et al.

[11] 3,872,110
[45] Mar. 18, 1975

[54] METHOD OF PREPARING HYDROHALIDES OF ASPARTIC ANHYDRIDE

[75] Inventors: Yasuo Ariyoshi, Yokohama; Tetsuo Yamatani; Noboru Uchiyama, both of Kawasaki; Naotake Sato, Tokyo; Koji Toi, Yokohama, all of Japan

[73] Assignee: Ajinomoto Co., Inc., Tokyo, Japan

[22] Filed: Apr. 24, 1972

[21] Appl. No.: 246,781

[30] Foreign Application Priority Data
Apr. 28, 1971 Japan.............................. 46-28317

[52] U.S. Cl. ......................... 260/346.8 R, 260/694
[51] Int. Cl. ............................................. C07c 55/02
[58] Field of Search .................. 260/346.8 R, 346.3

[56] References Cited
UNITED STATES PATENTS

| | | | |
|---|---|---|---|
| 3,357,994 | 9/1965 | Popp | 260/346.8 R |
| 3,462,460 | 8/1969 | Kollonitsch | 260/345.9 |
| 3,472,875 | 10/1969 | DiLeone | 260/346.3 |

FOREIGN PATENTS OR APPLICATIONS

| | | | |
|---|---|---|---|
| 1,158,723 | 7/1969 | United Kingdom | 260/346.8 |
| 2,107,358 | 9/1971 | Germany | 260/346.8 |

OTHER PUBLICATIONS

Morrison, Organic Chemistry, Allyn & Bacon, Boston (1961), pp. 444, 445 and 679.

Fieser, et al. Organic Syntheses, Vol. 2–Collective, Wiley and Sons, pp. 560–563.

Primary Examiner—Donald G. Daus
Assistant Examiner—Ralph D. McCloud
Attorney, Agent, or Firm—Hans Berman; Kurt Kelman

[57] ABSTRACT

The hydrochloride and hydrobromide of aspartic anhydride are obtained in high yields when the known reaction between one mole of aspartic acid and suitable halide dehydrating agents, such as phosphorus chlorides, is carried out in the presence of at least one mole of a lower alkanoic acid which provides at least a portion of the liquid reaction medium. The yield is further improved by adding the anhydride of the alkanoic acid to the reaction mixture.

12 Claims, No Drawings

METHOD OF PREPARING HYDROHALIDES OF ASPARTIC ANHYDRIDE

This invention relates to the preparation of hydrohalides of aspartic anhyride, and particularly to an improvement in the preparation of aspartic anhydride from aspartic acid and a suitable halogen bearing dehydrating agent.

The hydrohalides of aspartic anhydride, particularly the hydrochloride and the hydrobromide, are known intermediates in the synthesis of peptides [J. Am. Chem. Soc. 85, 1839 (1963)] and are also known to improve the aroma of food (Dutch published patent application No. 6504992). They were usually prepared heretofore by dehydrating aspartic acid in a strongly acid medium, such as trifluoroacetic acid (British Patent No. 1,096,845). It is difficult to separate the desired hydrohalides of aspartic anhydride from the acid medium so that the hydrohalides are often obtained in the form of oily liquids containing enough acid contaminant to interfere with the formation of an amide bond.

It has now been found that the hydrochloride and hydrobromide of aspartic anhydride can readily be produced in high yields and in a state of high purity by reacting aspartic acid with a chlorine or bromine bearing dehydrating agent capable of forming hydrogen chloride or hydrogen bromide by reaction with the aspartic acid in a liquid medium essentially consisting of at least one mole of a monocarboxylic alkanoic acid having up to five carbon atoms in its molecule. The reaction is not adversely affected by the presence of solvents inert to the reactants and the reaction product, and is favorably affected by the presence of an anhydride of a monocarboxylic alkanoic acid having up to five carbon atoms. When the inert solvent present, if any, does not dissolve the hydrochloride or hydrobromide of aspartic anhydride, the desired product is obtained in the form of cyrstalline, solid particles which are readily recovered from the liquid reaction medium by filtering, centrifuging, or simply by decanting. When the product is soluble in the solvent, it may be recovered after evaporation of the solvent from the reaction mixture.

The dehydrating agents employed may be gases, solids, or liquids and may be halides of oxygen bearing acids, such as phosgene, oxalyl chloride, oxalyl bromide, thionyl chloride, thionyl bromide, acetyl chloride, acetyl bromide, phosphoryl chloride, and phosphoryl bromide, and the tri- and pentachlorides and corresponding bromides of phosphorus. Best results have been obtained with the phosphorus trihalides and pentahalides and with phosphoryl chloride.

The monocarboxylic alkanoic acids most suitable for this invention are acetic acid and propionic acid, but at least some advantages of this invention are achieved by using formic, butyric, and valerianic acid as the medium or as a portion of the liquid medium in which aspartic acid is reacted with the dehydrating agent. While it has not been established with certainty how the lower-alkanoic acids perform their beneficial function, it is thought that they react with the dehydrating agent to form the corresponding anhydrides or halides. Yet, they do not interfere with the formation of the desired hydrohalides of aspartic anhydride, but actually increase the yield under otherwise comparable conditions.

Aspartic acid may be employed as a starting material in the form of the free acid, of any salt of the acid, or of an addition compound with a hydrogen halide. Among the salts, the salts of which amino moieties are not protected, such as the sodium, potassium, and ammonium salts are more preferred for this reaction. The reaction is carried out in a liquid medium which may consist of the alkanoic acid mentioned, but may contain an inert organic solvent as a diluent which facilitates complete recovery of the product. The amount of alkanoic acid present in the medium during the dehydrating reaction must be not less than one mole per mole of aspartic acid, is preferably greater than 5 moles per mole of aspartic acid, and may be increased further without side effects other than those expected from the greater dilution of the primary reactants.

The solvents, if any, which may be mixed with the alkanoic acid in the reaction medium may be chosen freely on the basis of their inertness to the reactants and to the desired product. The halogenated hydrocarbons are preferred because of the convenience and safety of handling them in large amounts, but the range of available, suitable solvents is almost limitless. Among the common industrial solvents, ethyl ether, butyl ether, methyl propyl ether, methyl isopropyl ether, anisol, tetrahydrofuran, tetrahydropyran, dioxane, chloroform, dichloromethane, 1,2-dichloroethane, trichloroethylene, 1,1,2-trichloroethane, chlorobenzene, cyclohexane, benzene, toluene, and the lower alkyl esters of formic, acetic, propionic, butyric, and benzoic acid are equally inert. The amount of solvent employed is not critical.

When anhydrides of the alkanoic acids mentioned above, particularly acetic and propionic anhydride, are added to the reaction mixture, the yield of aspartic acid hydrohalide is increased, and the amount of dehydrating agent needed for best results may be decreased. The alkanoic acid anhydrides are thought to be unavoidable products of a reaction between the alkanoic acids and the dehydrating agents, yet, the addition of the anhydride in the early stages of the reaction has surprising beneficial effects.

The several basic components of the reaction mixture, that is, the aspartic acid, the dehydrating agent, the alkanoic acid, and the inert solvent, if any, may be mixed in any desired sequence. If acetic anhydride or propionic anhydride is added to the mixture, best results are obtained when the dehydrating agent can react for at least a short while with the aspartic acid prior to the addition of the anhydride.

The dehydrating agent is used in an amount at least sufficient for releasing one mole hydrogen halide for each mole of aspartic acid. Thus the phsophorus trihalides and pentahalides are used in amounts of ⅓ mole per mole of aspartic acid, or more. Phosgene is employed in at least equimolecular amounts. A small excess of the dehydrating agent is generally beneficial, but nothing useful is achieved with a large excess, such as more than six moles per mole of aspartic acid. To be of substantial benefit, a separately added anhydride of a lower alkanoic acid, that is, an acid having not more than five carbon atoms, should be provided in an amount of not less than ½ mole per mole of aspartic acid.

The reaction between the aspartic acid and the dehydrating agent in the presence of a lower alkanoic acid proceeds smoothly at ordinary room temperature of about 15°–25°C, and is most economically performed at room temperature. The reaction rate rises and drops with the temperature, and becomes impractically low at temperatures much below 0°C. At temperatures much higher than room temperature, undesired racemization of the optically active material may occur. As available equipment and other considerations may warrant, the reaction temperature may be chosen between −20°C and 60°C, but these limits are not critical.

The following examples are further illustrative of this invention.

EXAMPLE 1

3.8 g Phosphorus trichloride was stirred at ambient temperature into a suspension of 10 g L-aspartic acid in 40 ml propionic acid, and stirring was continued for 90 minutes after mixing was completed. Thereafter, 5.0 g acetic anhydride were added, and stirring was continued at ambient temperature for eight hours.

A crystalline precipitate of L-aspartic anhydride hydrochloride was separated from the liquid medium by filtering and washed with ether. It weighed 10.6 g (93% yield) and melted at 139° – 140°C with decomposition. It was identified by elementary analysis:

|  | C | H | N | Cl |
|---|---|---|---|---|
| Found: | 31.32 | 4.22 | 9.16 | 23.43 |
| Calculated for $C_4H_6NO_3Cl$ | 31.70 | 3.99 | 9.24 | 23.40 |

EXAMPLE 2

10.4 g Phosphorus trichloride was stirred into a suspension of 30 g L-aspartic acid in a mixture of 50 ml acetic acid and 35 ml ethylene dichloride. Stirring at ambient temperature was continued for four hours after the mixture was homogeneous. Thereafter, 10.4 g additional phosphorus trichloride dissolved in 15 ml acetic acid was added, and the mixture was stirred overnight.

Crystalline L-aspartic acid anhydride hydrochloride was recovered by filtering and washed first with acetic acid and then with ethylene dichloride. It weighed 33.1 g (97% yield).

EXAMPLE 3

3.8 g Phosphorus trichloride was stirred into a suspension of 10 g DL-aspartic acid in 50 ml butyric acid at room temperature. After one hour of stirring, 9.2 g acetic anhydride was added, and stirring was continued for 47 hours at ambient temperature.

The DL-aspartic anhydride hydrochloride recovered from the reaction mixture was washed with ether and weighed 9.4 g when dry (82% yield).

EXAMPLE 4

2.1 g Phosphorus tribromide was stirred at room temperature into a suspension of 2 g L-aspartic acid in 10 ml propionic acid. After 90 minutes of additional stirring, 1.8 g acetic anhydride was added, and stirring was continued for seven hours.

L-Aspartic anhydride hydrobromide was filtered from the reaction mixture, washed with ether, and dried. It weighed 2.5 g (85% yield).

EXAMPLE 5

10 Millimole phosphorus oxychloride was stirred into a suspension of 15 millimole L-aspartic acid hydrochloride in 10 ml propionic acid. After 90 minutes, 15 millimole acetic anydride was added, and the reaction mixture was further treated as in Example 1.

L-Aspartic anhydride hydrochloride was recovered in a yield of 72%.

EXAMPLE 6

15 Millimole phosphorus trichloride was stirred into a suspension of 15 millimole monosodium L-aspartate in 10 ml propionic acid. 18 Millimole acetic anhydride was added after 90 minutes, and the procedure of Example 1 was generally followed.

The yield of recovered L-aspartic anhydride hydrochloride was 88%.

EXAMPLE 7

In a series of runs, the general procedure of Example 1 was applied to 15 millimole L-aspartic acid dispersed in 10 ml propionic acid. For each of the runs (a) to (e), the dehydrating agent, the amount of added acetic anhydride, and the yield (%) of L-aspartic anhydride hydorchloride are listed in the following Table.

TABLE

| Run | Dehydrating agent | mM Acetic anhydride | % Yield |
|---|---|---|---|
| (a) | 15 mM $POCl_3$ | 18 | 74 |
| (b) | 7.5 mM $PCl_5$ | 7.5 | 77 |
| (c) | 10 mM $SOCl_2$ | 15 | 56 |
| (d) | 10 mM $COCl_2$ | 18 | 51 |
| (e) | 15 mM $C_2O_2Cl_2$ | 15 | 78 |

EXAMPLE 8

In the procedure of run (b) in Example 7, $PCl_5$ was replaced by 6 mM $PCl_3$, and propionic acid was replaced by an equal amount of acetic acid. The yield was 68%.

In the procedure of run (e) in Example 7, the oxalyl chloride was replaced by 6 mM $PBr_5$. The same yield of 78% was achieved for the aspartic acid hydrobromide so produced.

EXAMPLE 9

15 Millimole L-aspartic acid was reacted in 10 ml propionic acid with 15 millimole phosphorus trichloride under the general conditions of time and temperature employed in Example 1, but the addition of acetic anhydride was omitted. The yield of recovered L-aspartic anhydride hydrochloride was only 51%.

A yield of 85% was reached without additional acetic anhydride when the solvent medium consisted of 5 ml acetic acid and 5 ml ethylene dichloride, and the dehydrating agent consisted of a mixture of 15 millimole phosphorus trichloride and 1.5 millimole acetyl chloride.

EXAMPLE 10

6.4 g Phosphorus trichloride was stirred at room temperature into a suspension of 13.3 g L-aspartic acid in a mixture of 20 ml ethylene dichloride and 20 ml acetic acid, and stirring at ambient temperature continued for 22 hours. The crystalline L-aspartic anhydride hydrochloride formed was recovered by filtration, washed with ethylene dichloride, and dried. It weighed 13.0 g (86% yield).

While the dehydrating agent was dispersed in each of the preceding Examples in a suspension of the liquid medium at least partly constituted by a lower alkanoic acid, substantially identical results were achieved by adding aspartic acid or an alkali metal aspartate or an aspartic acid hydrohalide to a solution of the dehydrating agent, or by separately preparing a suspension of the aspartic acid source in a portion of the liquid medium and a solution of the dehydrating agent in another portion of the medium, and by thereafter mixing the solution with the suspension.

In all Examples, cooling or heating were omitted as being unnecessary, but, within the limits indicated hereinbefore, temperatures other than ambient or room temperature may be chosen without affecting the results achieved.

It should be understood, therefore, that the foregoing disclosure relates only to preferred embodiments of the invention, and that it is intended to cover all changes or modifications of the examples of the invention herein chosen for the purpose of the disclosure which do not constitute departures from the spirit and scope of the invention set forth in the appended claims.

What is claimed is:

1. In a method of converting aspartic acid to the hydrochloride or hydrobromide of aspartic acid anhydride by reacting said aspartic acid in a liquid medium with a chlorine or bromine bearing dehydrating agent capable of forming hydrogen chloride or hydrogen bromide by reaction with said aspartic acid, the improvement which consists in the presence in said liquid medium of at least one mole of a monocarboxylic, unsubstituted alkanoic acid per mole of said aspartic acid, said alkanoic acid having not more than five carbon atoms in the molecule thereof, said medium, prior to said reacting, being free of components other than said alkanoic acid and capable of reacting with said aspartic acid, said dehydrating agent, and said hydrochloride or hydrobromide of aspartic anhydride.

2. A method of converting aspartic acid to the hydrochloride or hydrobromide of aspartic acid annydride which comprises reacting said aspartic acid in the form of a salt thereof with an alkali metal or ammonium, or in the form of an acid addition salt with hydrogen chloride or hydrogen bromide in a liquid medium with a chlorine or bromine bearing dehydrating agent capable of forming hydrogen chloride or hydrogen bromide by reaction with aspartic acid, said liquid medium including at least one mole of a monocarboxylic, alkanoic acid, said alkanoic acid being of the formula $C_nH_{2n+1}COOH$, wherein $n$ is an integer up to 4, said medium, prior to said reacting, being free of components other than said alkanoic acid capable of reacting with said aspartic acid, said dehydrating agent, and said hydrochloride or hydrobromide of aspartic anhydride, and free of a free acid stronger than said alkanoic acid.

3. In a method as set forth in claim 1, said dehydrating agent being phosgene, oxalyl chloride, oxalyl bromide, thionyl chloride, thionyl bromide, acetyl chloride, acetyl bromide, phosphoryl chloride, phosphoryl bromide, phosphorus trichloride, phosphorus pentachloride, phosphorus tribromide, or phosphorus pentabromide, and said dehydrating agent being present in said liquid medium in an amount sufficient to produce one mole of hydrogen halide by reaction with one mole of said aspartic acid.

4. In a method as set forth in claim 3, said medium being free of a free acid stronger than said alkanoic acid prior to said reacting of said aspartic acid with said dehydrating agents.

5. In a method as set forth in claim 4, said liquid medium further including at least ½ mole of an anhydride of a monocarboxylic, alkanoic acid per mole of said aspartic acid, said anhydride of a monocarboxylic alkanoic acid having not more than five carbon atoms in the molecule thereof.

6. In a method as set forth in claim 5, said anhydride of an alkanoic acid being acetic anhydride or propionic anhydride.

7. In a method as set forth in claim 4, said alkanoic acid being acetic acid or propionic acid.

8. In a method as set forth in claim 4, said liquid medium essentially consisting of said alkanoic acid and an organic solvent inert to said aspartic acid, to said dehydrating agent, and to said hydrochloride or hydrobromide of aspartic anhydride.

9. In a method as set forth in claim 8, said organic solvent being a halogenated hydrocarbon.

10. In a method as set forth in claim 4, said medium essentially consisting of said alkanoic acid.

11. In a method as set forth in claim 4, said dehydrating agent being a phosphorus halide or phosphorus oxyhalide.

12. A method as set forth in claim 2, wherein said medium essentially consists of said alkanoic acid and an organic solvent inert to said aspartic acid in said forms thereof, said dehydrating agent, and said hydrochloride or hydrobromide of aspartic anhydride.

* * * * *